United States Patent
Jevans et al.

(10) Patent No.: US 8,639,873 B1
(45) Date of Patent: Jan. 28, 2014

(54) DETACHABLE STORAGE DEVICE WITH RAM CACHE

(75) Inventors: David Alexander Jevans, Los Altos, CA (US); Gil Spencer, Redwood Estates, CA (US)

(73) Assignee: Imation Corp., Oakdale, MN (US)

( * ) Notice: Subject to any disclaimer, the term of this patent is extended or adjusted under 35 U.S.C. 154(b) by 607 days.

(21) Appl. No.: 11/644,051

(22) Filed: Dec. 21, 2006

Related U.S. Application Data

(60) Provisional application No. 60/752,310, filed on Dec. 22, 2005.

(51) Int. Cl.
 *G06F 12/00* (2006.01)
 *G06F 12/08* (2006.01)
 *G06F 12/14* (2006.01)

(52) U.S. Cl.
 USPC ........... 711/104; 711/115; 711/118; 711/135; 711/164; 711/E12.008; 711/E12.093

(58) Field of Classification Search
 None
 See application file for complete search history.

(56) References Cited

U.S. PATENT DOCUMENTS

| | | | |
|---|---|---|---|
| 4,578,530 A | 3/1986 | Zeidler | |
| 5,010,571 A | 4/1991 | Katznelson | |
| 5,265,159 A | 11/1993 | Kung | |
| 5,341,339 A | 8/1994 | Wells | |
| 5,404,485 A | 4/1995 | Ban | |
| 5,479,638 A | 12/1995 | Assar et al. | |
| 5,857,021 A | 1/1999 | Kataoke et al. | |
| 5,937,425 A | 8/1999 | Ban | |
| 6,032,227 A * | 2/2000 | Shaheen et al. | 711/129 |
| 6,092,196 A | 7/2000 | Reiche | |
| 6,118,874 A | 9/2000 | Okamoto et al. | |
| 6,223,284 B1 | 4/2001 | Novoa | |
| 6,292,899 B1 | 9/2001 | McBride | |
| 6,731,536 B1 | 5/2004 | McClain | |
| 6,763,468 B2 | 7/2004 | Gupta et al. | |
| 6,776,332 B2 * | 8/2004 | Allen et al. | 235/380 |
| 6,791,877 B2 * | 9/2004 | Miura et al. | 365/185.11 |
| 6,834,795 B1 | 12/2004 | Rasmussen et al. | |
| 6,920,527 B2 * | 7/2005 | Cloutier et al. | 711/115 |
| 6,961,852 B2 | 11/2005 | Craft | |
| 6,987,927 B1 | 1/2006 | Battaglia et al. | |
| 6,993,661 B1 | 1/2006 | Garfinkel | |
| 7,266,699 B2 * | 9/2007 | Newman et al. | 713/182 |
| 7,272,723 B1 | 9/2007 | Abbott et al. | |

(Continued)

FOREIGN PATENT DOCUMENTS

WO     WO 02/47081 A2     6/2002

OTHER PUBLICATIONS

Denning, Dorothy E. et al. "A Taxonomy for Key Escrow Encryption Systems," *Communications of the ACM*, vol. 39, No. 3, pp. 34-40 (Mar. 1996).

(Continued)

*Primary Examiner* — Reginald Bragdon
*Assistant Examiner* — Eric Loonan
(74) *Attorney, Agent, or Firm* — Dorsey & Whitney LLP

(57) ABSTRACT

A detachable storage device can comprise a ram cache, a device controller, and a storage system. The ram cache may be configured to receive data from a digital device. The device controller may be configured to transfer the data from the ram cache to the storage system. The storage system may be configured to store the data at a predetermined event.

23 Claims, 8 Drawing Sheets

(56) References Cited

U.S. PATENT DOCUMENTS

| | | | |
|---|---|---|---|
| 7,275,139 B1 | 9/2007 | Tormasov et al. | |
| 7,278,025 B2 | 10/2007 | Saito et al. | |
| 7,360,091 B2 | 4/2008 | Aikawa et al. | |
| 7,412,420 B2 | 8/2008 | Holdsworth | |
| 7,475,425 B2 | 1/2009 | Bantz et al. | |
| 7,478,248 B2 | 1/2009 | Ziv et al. | |
| 7,511,233 B2* | 3/2009 | Pocrass | 174/541 |
| 7,631,191 B2 | 12/2009 | Glazer et al. | |
| 7,685,425 B1 | 3/2010 | Wright et al. | |
| 7,698,442 B1 | 4/2010 | Krishnamurthy et al. | |
| 7,757,088 B2 | 7/2010 | Abdulhayoglu | |
| 8,015,606 B1 | 9/2011 | Jevans et al. | |
| 2001/0045451 A1 | 11/2001 | Tan et al. | |
| 2002/0029215 A1 | 3/2002 | Whitmyer, Jr. | |
| 2002/0046342 A1 | 4/2002 | Elteto et al. | |
| 2003/0005336 A1 | 1/2003 | Poo et al. | |
| 2003/0041253 A1 | 2/2003 | Matsui et al. | |
| 2003/0149670 A1 | 8/2003 | Cronce | |
| 2003/0149854 A1 | 8/2003 | Yoshino et al. | |
| 2003/0182584 A1 | 9/2003 | Banes | |
| 2003/0204735 A1 | 10/2003 | Schnitzmeier | |
| 2003/0204754 A1 | 10/2003 | Cromer et al. | |
| 2003/0215090 A1 | 11/2003 | Saito et al. | |
| 2004/0059925 A1 | 3/2004 | Benhammou et al. | |
| 2004/0073797 A1 | 4/2004 | Fascenda | |
| 2004/0103288 A1 | 5/2004 | Ziv et al. | |
| 2004/0103325 A1 | 5/2004 | Priebatsch | |
| 2004/0123113 A1 | 6/2004 | Mathiassen et al. | |
| 2004/0146015 A1 | 7/2004 | Cross et al. | |
| 2004/0148333 A1 | 7/2004 | Manion et al. | |
| 2004/0177258 A1 | 9/2004 | Ong | |
| 2004/0188710 A1 | 9/2004 | Koren et al. | |
| 2005/0015540 A1* | 1/2005 | Tsai et al. | 711/103 |
| 2005/0020315 A1 | 1/2005 | Robertson | |
| 2005/0044377 A1 | 2/2005 | Huang | |
| 2005/0055519 A1 | 3/2005 | Stuart et al. | |
| 2005/0182973 A1* | 8/2005 | Funahashi et al. | 713/202 |
| 2006/0016875 A1 | 1/2006 | Bonalle et al. | |
| 2006/0021059 A1 | 1/2006 | Brown et al. | |
| 2006/0041932 A1 | 2/2006 | Cromer et al. | |
| 2006/0047717 A1 | 3/2006 | Pereira | |
| 2006/0069840 A1 | 3/2006 | Corbett et al. | |
| 2006/0095688 A1 | 5/2006 | Kawamura et al. | |
| 2006/0117393 A1 | 6/2006 | Merry et al. | |
| 2006/0129830 A1 | 6/2006 | Haller et al. | |
| 2006/0143476 A1 | 6/2006 | McGovern | |
| 2006/0179309 A1 | 8/2006 | Cross et al. | |
| 2006/0208066 A1 | 9/2006 | Finn et al. | |
| 2006/0224742 A1 | 10/2006 | Shahbazi | |
| 2006/0236363 A1 | 10/2006 | Heard et al. | |
| 2007/0016743 A1 | 1/2007 | Jevans | |
| 2007/0016756 A1 | 1/2007 | Hsieh et al. | |
| 2007/0028033 A1 | 2/2007 | Hsieh et al. | |
| 2007/0033330 A1 | 2/2007 | Sinclair et al. | |
| 2007/0038802 A1 | 2/2007 | Tsai et al. | |
| 2007/0056043 A1 | 3/2007 | Onyon et al. | |
| 2007/0067620 A1 | 3/2007 | Jevans | |
| 2007/0101434 A1 | 5/2007 | Jevans | |
| 2007/0118898 A1 | 5/2007 | Morgan et al. | |
| 2007/0143530 A1 | 6/2007 | Rudelic et al. | |
| 2007/0143532 A1 | 6/2007 | Gorobets et al. | |
| 2007/0180509 A1 | 8/2007 | Swartz et al. | |
| 2007/0250919 A1 | 10/2007 | Shull et al. | |
| 2007/0266421 A1 | 11/2007 | Vaidya et al. | |
| 2007/0300031 A1 | 12/2007 | Jevans et al. | |
| 2007/0300052 A1 | 12/2007 | Jevans | |
| 2008/0005561 A1 | 1/2008 | Brown et al. | |
| 2008/0052461 A1* | 2/2008 | Kavian | 711/115 |
| 2009/0222117 A1* | 9/2009 | Kaplan et al. | 700/94 |

OTHER PUBLICATIONS

Tal, Arie. "Two Technologies Compared: NOR v. NAND", White Paper, 01-SR-012-04-8L, Rev. 1.1, Jul. 2003, pp. 1-14.

National Institute of Standards and Technology. "Federal Information Processing Standards Publication 197." Nov. 2001.

Kingston. "Kingston Data Traveler Elite: Advanced Security and High Performance." Oct. 2004. http://www.kingstom.com/digitalmedia/dt_elite.wp.pdf.

Army Regulation 380-19. "Information Systems Security." Feb. 27, 1998. Department of the Army. Appendix F. pp. 28-30.

Sedaghat et al. "A Dynamic Web Agent for Verifying the Security and Integrity of a Web Site's Contents," IEEE, Aug. 2002.

Gutmann, Peter. "Secure Deletion of Data from Magnetic and Solid-State Memory." USENIX. Sixth USENIX Security Symposium Proceedings, San Jose, California, Jul. 1996. http://www.cs.auckland.ac.nz/~pgut001/pubs/secure_del.html.

Fischer, Viktor et al. "True Random Number Generator Embedded in Reconfigurable Hardware." Springer-Verlag. Lecture Notes in Computer Science. Vol. 2523, pp. 415-430. 2003.

* cited by examiner

DETACHABLE STORAGE DEVICE WITH RAM CACHE

CROSS-REFERENCE TO RELATED APPLICATIONS

This claims benefit to U.S. provisional patent Ser. No. 60/752,310, filed Dec. 22, 2005, entitled "USB Device with Ram Disk for Optimized Portable Application Performance" which is incorporated by reference herein.

This application is related to U.S. application Ser. No. 11/486,799, filed Jul. 14, 2006, entitled "Secure Storage Device with Offline Code Entry", which claims benefit to U.S. provisional patent Ser. No. 60/698,899, filed Jul. 14, 2005, entitled "Secure Storage Device with Offline Password Entry," both of which are incorporated by reference herein.

BACKGROUND

1. Field of the Invention

The present invention relates generally to data storage, and more particularly to detachable storage devices with ram cache.

2. Background Art

As data processing becomes ubiquitous, users are increasingly demanding that data be both mobile and secure. Although networks, such as the Internet, can transmit data from one computer to another, users often must identify and transmit the data they need to the proper destination. Unfortunately, the data may fail to be transmitted due to firewalls, proxies, spam blockers, size limitations, technical error, or human error. Further, it is not always practical for users to guess what data is needed at a future time and the location of the need. The data is also often routed through unsecure servers or network devices which can intercept the data and further compromise security.

As a result of these problems, users often load data on USB memory devices (e.g., a memory stick) and carry data with them. Unfortunately, USB memory devices can be stolen and accessed by thieves. Some USB memory devices have passwords which must be entered on the host computer before accessing the stored data. However, the password can be cracked (e.g., a brute force attack) and the data accessed.

Some USB memory devices lock the stored data after a predetermined number of password attempts have been made to prevent data theft. Unfortunately, the lock is often easy to reset. Further, the attacker can make a copy of the data stored in the USB memory device, enter the predetermined number of password attempts, delete the data, recopy the data, and enter new password attempts. This process can be repeated until successful thereby inevitably accessing the data.

Current USB memory devices do not have active security or security programs that help to protect the user's data or computer resources. In one example, current USB memory devices do not assist the user to identify web sites that are not secure or help update information to help make browsing safer.

Although applications may be stored on a USB memory device, performance may be poor and reduce the overall lifespan of the USB memory device. Typically, the flash memory contained within USB memory devices transfers data slowly when compared to a hard drive. As a result, the performance of applications stored within flash memory may be significantly slower than applications stored in a computer. Further, most flash memory has a limited duty cycle. As a result, applications with data that is constantly saved and/or retrieved from flash memory may limit the life expectancy of the USB memory device.

SUMMARY OF THE INVENTION

An exemplary system to store data within a detachable storage device can comprise a ram cache, a device controller, and a storage system. The ram cache may be configured to receive data from a digital device. The device controller may be configured to transfer the data from the ram cache to the storage system. The storage system may be configured to store the data at a predetermined event, the predetermined event can be when the detachable storage device is decoupled from the digital device.

The detachable storage device can be a USB storage device. The storage system within the detachable storage device may comprise a storage system. The ram cache can comprise dynamic random access memory (DRAM).

In various embodiments, the detachable storage device can further comprise a user interface and circuitry. The user interface can be configured to receive a user code from a user when the detachable storage device is in a detached state to authorize access to a storage partition within the storage system. The circuitry can be configured to authorize access to the stored data within the storage system based, at least in part, on the user code and provide access to the storage partition.

The detachable storage device may also comprise a communications interface configured to send a signal to the digital device that a storage partition is authorized for access. The circuitry may be configured to alert the user that access to the storage partition is allowed based on the authorization. The circuitry can also be configured to decrypt a security code based on the user code. Further, the circuitry can be configured to decrypt at least some of the stored data within the storage partition.

An exemplary method for storing data within a detachable storage device can comprise receiving data from a digital device with the detachable storage device; storing the data within a ram cache; and transferring the data from the ram cache to a storage system within the detachable storage device at a predetermined event.

An exemplary computer readable medium can have embodied thereon a program. The program is executable by a processor to perform a method for storing data within a detachable storage device. The method may comprise receiving data from a digital device with the detachable storage device, storing the data within a ram cache, and transferring the data from the ram cache to a storage system within the detachable storage device at a predetermined event.

DETAILED DESCRIPTION

Figure 1:
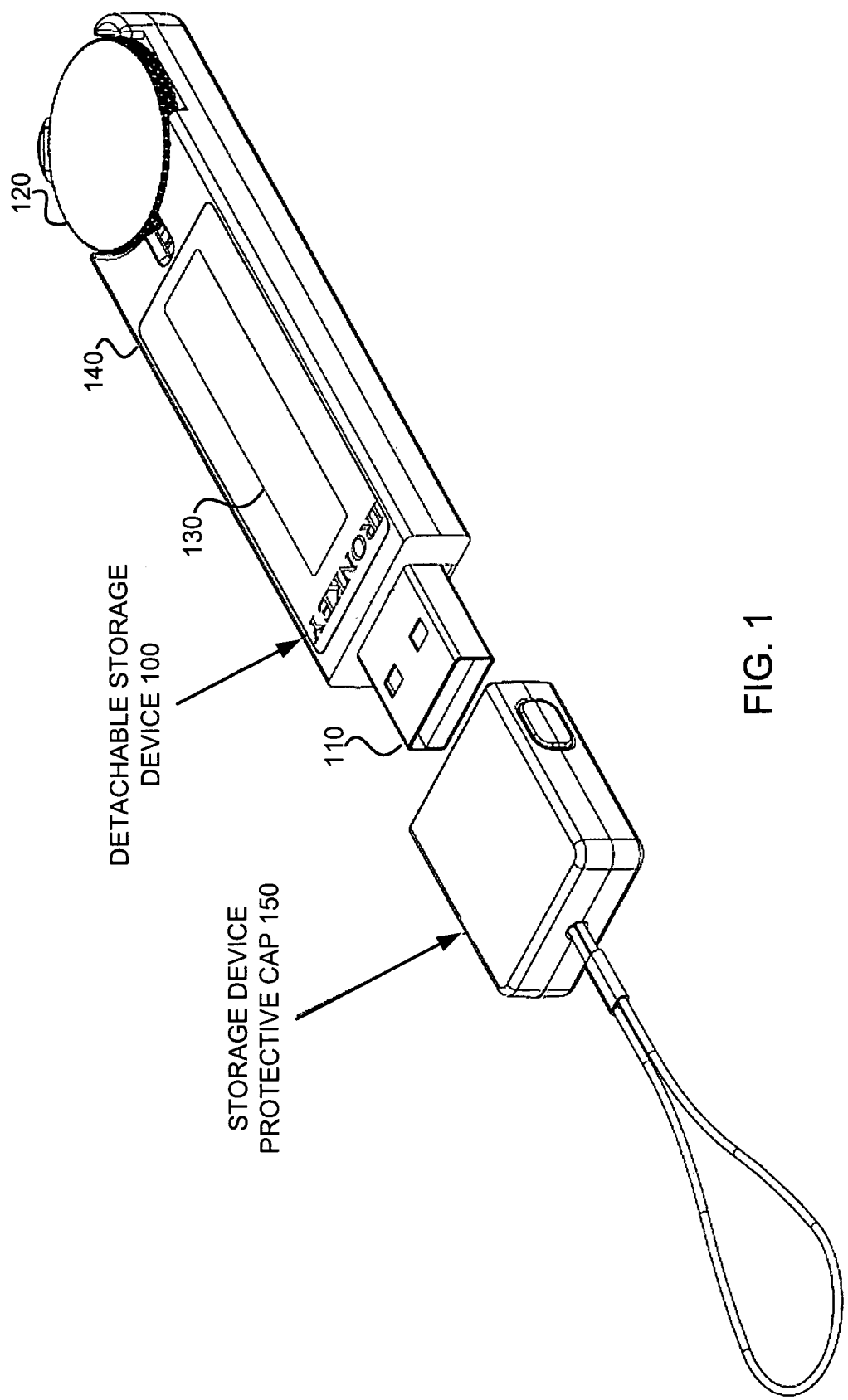
FIG. 1 depicts a detachable storage device, in accordance with one embodiment of the present invention.

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

A detachable storage device is any storage device (e.g., hard drive, storage card, flash device, USB storage device) that is designed to be operatively coupled with the digital device. A detachable storage device may comprise a secure storage device. A digital device is any device with a processor capable of sending or receiving data (e.g., a computer, laptop, personal digital assistant, and cell phone).

A detachable storage device can comprise a ram cache as well as a storage system. A ram cache is a cache in ram (e.g., a ram disk) that temporary files may be stored. The storage system is any storage other than ram that may store data (e.g., hard drive, flash, storage card.) In one example, one or more files may be stored within the ram cache of the detachable storage device. Files that are repeatedly requested may be retrieved from the ram cache of the detachable storage device. The time to retrieve the files from the ram cache may be significantly faster than the time to retrieve files from the storage system.

In various embodiments, the storage system of the detachable storage device may comprise one or more applications such as a web browser (e.g., Firefox, Internet Explorer.) Such applications may periodically store temporary files (e.g., web pages or logs) or save copies of files for security or automatic recovery. The temporary files or copies may be initially stored within the ram cache. The files within the ram cache may be stored to the storage system of the detachable storage device at a predetermined event. A predetermined event can comprise any event, including, but not limited to, a predetermined period of time, a termination of the application, or a detachment of the detachable storage device from the digital device.

The use of ram cache within the detachable storage device can extend the life of the detachable storage device. The storage system may comprise computer readable media such as flash media that has a limited duty cycle. A storage system duty cycle is the maximum number of times that files may be saved to the storage system before the storage system ceases to function. Applications resident within the storage system can continuously save and retrieve files to the ram cache without reducing the life of the storage system.

The detachable storage device, such as portable memory device, can require the user to input a user code offline to unlock the stored data within the detachable storage device. A user code is manually input the detachable storage device and comprises a password, code, or a user identifier. The user code can be a unique set of characters that may contain a variety of characters (alphanumeric, numeric, symbols, or special characters). In other embodiments, the user code can comprise a user identifier such as a fingerprint, voice identifier, or retina scan.

Entering the user code offline comprises the user entering the user code into the detachable storage device before the detachable storage device is operationally coupled with a digital device (i.e., the detachable storage device is in a detached state.) To be operationally coupled, the detachable storage device is coupled with a digital device and is enabled to receive commands and/or data from the digital device (i.e., the detachable storage device is in an attached state.)

In one example, the user enters the user code into the detachable storage device to authorize access to the stored data. The user can subsequently plug the detachable storage device into the digital device. The digital device can then proceed to mount an unlocked data storage partition and access the stored data. If the user does not enter the user code or enters an incorrect user code and proceeds to plug the detachable storage device into the digital device, the digital device may not be able to access the stored data.

By entering the user code directly into the detachable storage device rather than through a digital device, neither the stored data nor the device driver may be accessed. In some embodiments, the digital device does not recognize the detachable storage device and the media within the detachable storage device cannot be mounted until the correct user code is entered. Consequently, the stored data cannot be copied from the detachable storage device without a user code. As a result, the stored data cannot be copied from the detachable storage device onto another media to attack the user code or apply new software attacks to retrieve the stored data. The danger of theft of the detachable storage device is reduced as the thief may not be able to access the stored data.

Referring to FIG. 1, a detachable storage device 100 in accordance with one embodiment of the present invention is shown. The detachable storage device 100 comprises a USB connector 110 coupled to a storage device housing 140. A user can turn a user input dial 120 to enter the user code into the detachable storage device 100. In various embodiments, a display 130 (discussed further herein) may display characters or text to the user. The display 130 may display information to the user indicating that the user code is correct or incorrect.

In some embodiments, the display 130 and/or an authorization indicator (not depicted) indicates when the user code has been accepted and access to the stored data on the detachable storage device 100 has been authorized. The authorization indicator may be a light emitting diode (LED), a speaker, or any other device that can indicate that access to the stored data has been authorized.

In one example, a user carries stored data within the detachable storage device 100. Prior to plugging the detachable storage device 100 into a digital device's USB port, the user enters the user code into the detachable storage device 100 by turning the user input dial 120 to enter the user code. After the correct user code has been entered, the display 130 can illuminate or otherwise indicate that access to the stored data has been authorized. The user may then proceed to plug the detachable storage device 100 into the digital device to access the stored data.

If the user fails to enter the correct user code but plugs the detachable storage device 100 into the digital device, the digital device may fail to recognize the detachable storage device 100, fail to mount the digital media within the detachable storage device 100, fail to execute the device driver for the detachable storage device 100, and/or be unable to access the stored data.

The user may operate the user input dial 120 to input the user code and/or operate a menu displayed on the display 130. In some embodiments, the user may operate the user input dial 120 in a manner similar to a blackberry jog dial.

The display 130 is any screen that may display information. In some embodiments, the display 130 is a LCD display. The display 130 may display information indicating that access to the stored data (or a storage partition) is authorized, that the device is locked, that the user name is incorrect, or that a password is incorrect. In various embodiments, the display 130 can display the name of any applications that are resident on the detachable storage device 100.

The USB connector 110 can be coupled to any USB port of the digital device. Although a USB connector 110 is depicted in FIG. 1, the detachable storage device 100 is not limited to a USB type connector. In some embodiments, the detachable storage device 100 can be coupled to the digital device through a firewire connection, Ethernet connection, serial connection, parallel connection, SCSI connection, Host Bus Adapter, flash card interface, or ATA connection. Further, the detachable storage device 100 can operationally couple wirelessly to the digital device over 802.11a/b/g/n standards, Bluetooth, or wireless USB. It is apparent to those skilled in the art that the detachable storage device 100 can be operationally coupled to the digital device in many ways.

In various embodiments, the detachable storage device 100 can be physically or wirelessly coupled to the digital device but the connection is not operational until the user code is entered into the detachable storage device 100. In one example, the detachable storage device 100 comprises the USB connector 110 coupled to the digital device. Until the user code is entered into the detachable storage device 100, the digital device may not recognize the detachable storage device 100, load the device driver for the detachable storage device 100, or mount the media contained within the detachable storage device 100.

The storage device housing 140 may contain any type of data storage medium or storage system as well as a power source. The data storage medium (not depicted) may comprise flash memory (e.g., NAND flash or NOR flash memory), a hard drive, ram disk, or any other kind of data storage. A storage system (further described in FIG. 6) can comprise the data storage medium.

The storage device housing 140 may also contain any type of ram cache (not depicted). Dynamic random access memory (DRAM) or any other kind of random access memory may comprise the ram cache, including, but not limited to SRAM and SDRAM. Data (e.g., files) may be stored within the ram cache. Storage of data within the ram cache may accelerate the access of the data files and reduce the number of times data is stored to the storage system which may extend the life of the data storage medium of the storage system.

The power source (not depicted) can be a rechargeable battery, a replaceable battery (e.g., AA), or a capacitor. In some embodiments, the battery or capacitor can be recharged by the digital device through the USB connector 110 (or any connector that couples the detachable storage device 100 to the digital device).

Although the user code input is facilitated by the user input dial 120 in FIG. 1, it is apparent to those skilled in the art that the user code can be input into the detachable storage device 100 in many ways. In one example, the detachable storage device 100 comprises a keypad with which the user can press keys to enter the user code. In another example, the detachable storage device 100 comprises a biometric sensor which can receive the voice, fingerprint, or retina scan of the user as the user code. The detachable storage device 100 can also comprise a radial knob input, a user input dial, and a code indicator which may be used by a user to input the user code.

The optional authorization indicator displays an indicator when the user code has been accepted and that access to the stored data is authorized. The authorization indicator can comprise a light emitting diode (LED) that emits a light to indicate that the user code has been accepted. In some embodiments, the authorization indicator can generate a light of a first color to indicate user code acceptance (e.g., green) and a second color to indicate that the user code has been rejected (e.g., red). The authorization indicator may comprise multiple LEDs to indicate user code acceptance, rejection, or lockout of the detachable storage device 100 (further discussed in FIG. 7).

An authorization lockout may be triggered if one or more incorrect user codes are received. An authorization lockout locks the detachable storage device 100 so that the detachable storage device 100 will refuse to accept any user codes until reset. In other embodiments, a sound may be generated by the detachable storage device 100 to indicate that the user code has been accepted or rejected.

A storage device protective cap 150 may be coupled to the detachable storage device 100. The storage device protective cap 150 may protect the USB connector 110. In some embodiments, the storage device protective cap 150 may lock to the detachable storage device 100. The storage device protective cap 150 may be automatically unlocked when the user enters the correct user name or password into the detachable storage device 100.

Figure 2:
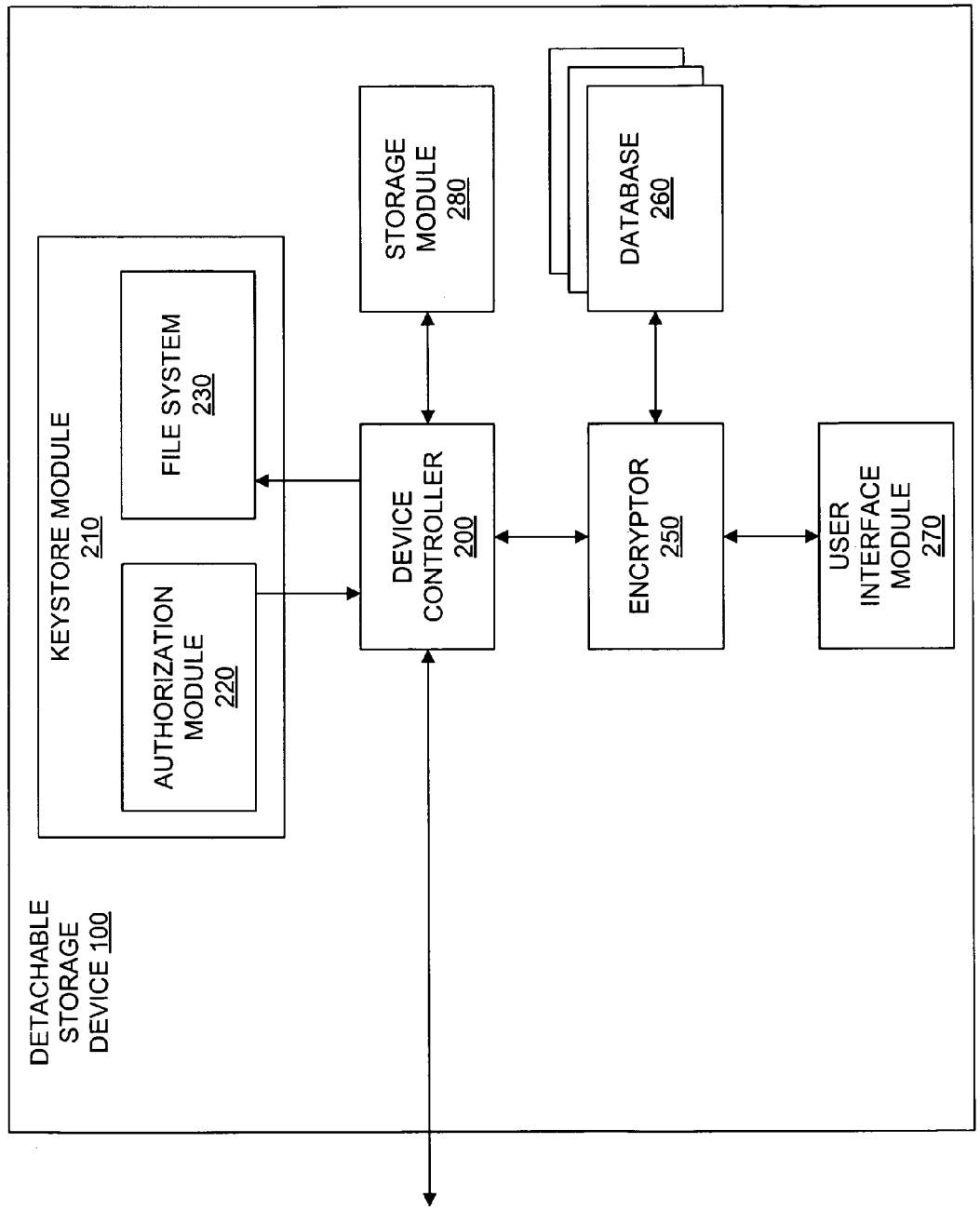
FIG. 2 depicts a block diagram of a detachable storage device, in accordance with one embodiment of the present invention.

FIG. 2 is a block diagram of a detachable storage device 100, in accordance with one embodiment of the present invention. The detachable storage device 100 comprises a device controller 200 coupled to the keystore module 210. The keystore module 210 comprises an authorization module 220 and a file system 230. The device controller 200 is further coupled to an encryptor 250 which is further coupled to database 260, a user interface module 270, and a storage module 280.

The device controller 200 can comprise the device driver for the detachable storage device 100. The device controller 200 controls the communication with the digital device (not depicted) as well as the operations within the detachable storage device 100. In some embodiments, the device controller 200 can control a processor or circuitry within the detachable storage device 100.

In various embodiments, the device controller 200 receives an identification query from a digital device requesting the type of device of the detachable storage device 100. If authorized, the device controller 200 can respond by transmitting a signal to the digital device identifying the detachable storage device 100 and allowing any digital media (e.g., data storage medium configured in one or more storage partitions) to be mounted within the operating system of the digital device. If not authorized, the device controller 200 may refuse to respond or reject the digital device's attempts to mount the digital media.

In other embodiments, the device controller 200 receives the identification query from the digital device and identifies the detachable storage device 100 as a compact disc (CD). The digital device may then attempt to automatically run an authorization check program from the device controller 200. This feature is similar to automatically playing the first song on an audio CD upon loading of the CD. The authorization check program can determine if access to the stored data is authorized. If access to stored data is not authorized, the authorization check program may terminate and the transmission of data between the digital device and the detachable storage device 100 may terminate. Further, the device controller 200 may refuse to allow the digital device access to the database 260 and/or refuse to allow the digital media to be mounted.

The device controller 200 may also control the authorization indicator (FIG. 1) based on an authorization indicator signal from the authorization module 220. In one example, if access to the stored data is authorized, the device controller 200 may send a signal to the authorization indicator to illuminate an LED or generate a sound to indicate that access to the stored data is authorized. The device controller 200 can also generate a signal to the authorization indicator to illuminate an LED, trigger a display on the LCD display 130, or generate a sound to indicate that authorization is denied or that the detachable storage device 100 is locked.

The keystore module 210 authorizes access to the stored data within the database 260. The keystore module 210 comprises the authorization module 220 and optionally a file system 230. In some embodiments, the keystore module 210 also comprises one or more authentication passwords to authorize access to the stored data. In other embodiments, the one or more authentication passwords are within the file system 230. An authentication password is a password, code, or key retained the detachable storage device 100 to authenticate the user code.

The authorization module 220 receives the user code or a security code (discussed herein) and determines if the user is authorized to access the stored data. In exemplary embodiments; the authorization module 220 determines if the user is authorized to access the stored data based on the user code (or the security code) and the one or more authentication passwords. In one example, the authorization module decrypts an authentication password with user code (or security code). If the decrypted authentication password is correct, then the user may be authorized to access the stored data. If the user is authorized to access the stored data, the authorization module 220 may transmit an authorization signal to the device controller 200 to authorize access. If the user is not authorized, the authorization module 220 may refuse to respond to subsequent attempts to access the data (e.g., locking the detachable storage device 100).

In some embodiments, the detachable storage device 100 does not comprise authentication passwords. As a result, the authorization module 220 can base the authorization determination on the user code. Those skilled in the art will appreciate that there may be many methods in which the authorization module 220 determine authorization to access the stored data based, at least in part, on the user code or security code.

The file system 230 can maintain a list of one or more authentication passwords and/or the file system of the database 260. In various embodiments, the file system 230 can associate each authentication password with a different storage partition within the digital media. As a result, separate user codes may access different storage partitions within the data storage medium. In one example, a first user code entered by a user may authorize access to a storage partition with data used at the user's home. A second user code may authorize access to a storage partition with business data. As a result, a single detachable storage device 100 may be shared with co-workers or others which may be allowed to access some, but not all, of the stored data retained within the detachable storage device 100. In other embodiments, the file system 230 can maintain a list of one or more user codes associated with the different storage partitions within the data storage medium.

Further, in some embodiments, the file system 230 maintains the scrambled database file system of the database 260. The database file system is a map of the stored data retained within the database 260. Without the database file system, the digital device may not be able to identify stored data contained within the database 260. By separating the database file system from the database 260, a thief who removes the database 260 from the detachable storage device 100 may fail to steal the database file system. Further, the database file system may be scrambled. The authorization module 220 can unscramble the database file system within the file system 230 or the database 260 when access to the stored data is authorized.

The encryptor 250 functions to encrypt or decrypt security codes, stored data within the database 260, or the file system 230. In exemplary embodiments, the stored data within the database 260 is encrypted. If access to stored data or a storage partition is authorized, the encryptor 250 encrypts data transmitted from the digital device prior to storage within the database 260. Further, as stored data is requested from the database 260, the encryptor 250 can decrypt the stored data prior to transmission of the stored data to the digital device. As a result, the stored data within the database 260 may always be encrypted.

The encryptor 250 can also decrypt the security code using the user code prior to authorization. When the security code is decrypted, the security code may be sent to the authorization module 220 where it may be compared to the one or more authentication passwords within the keystore module 210. In some embodiments, the database 260 and the keystore module 210 are retained on separate chips within the detachable storage device 100.

The database 260 can comprise one more databases or other data structures of stored data. The database 260 may be contained within a storage system. The storage system is further discussed in FIG. 8.

The user interface module 270 controls the user interface (e.g., the user input dial 120 in FIG. 1) and receives the user code. In exemplary embodiments, the user interface module 270 receives the user code from the user. In some embodiments, the user interface module 270 sends the user code to the encryptor 250 to decrypt the user code. In other embodiments, the user interface module 270 sends the user code to the encryptor 250 to decrypt a security code. The security code may be used to authorize access to the stored data.

The storage module 280 is configured to receive and store data within the ram cache. In one example, an application, such as a web browser is stored within the database 260. The user of the digital device may activate the web browser. Web pages and other temporary files may be stored within the ram cache by the storage module 280. Once the application is terminated, the ram cache may be cleared. In other embodiments, when the application is terminated, data within the ram cache may be stored within the database 260. Data may be received from any application (whether stored on the detachable storage device 100 or not) or operating system resource on the digital device to be stored within the ram cache by the storage module 280.

Although the storage module 280 is depicted as coupled with the device controller 200, files stored within the ram cache by the storage module 280 may be encrypted by the encryptor 250. In other embodiments, the data within the ram cache is only encrypted upon transfer to the database 260.

The storage module 280 may clear or transfer the data within the ram cache upon the occurrence of a predetermined event. Examples of the predetermined event include, but are not limited to, the lapse of a predetermined period of time (e.g., every ten minutes), the termination of an application, or the detachment of the detachable storage device 100.

The database 260 may be a data structure that spans the storage system as well as the ram cache. As a result, the database 260 can comprise the data and/or storage partitions stored within the ram cache and the storage system. When data is transferred from the ram cache to the storage system, the database 260 may be altered to reflect the change.

In another example, a word processor application may save documents to the ram cache at predetermined intervals. The word processor application may subsequently use the saved documents for recovery should the application fail or be unexpectedly terminated. The storage module 280 may transfer the saved documents from the ram cache to the database at predetermined intervals, upon the proper termination of the application, or upon detachment of the detachable storage device 100 from the digital device.

Figure 3:
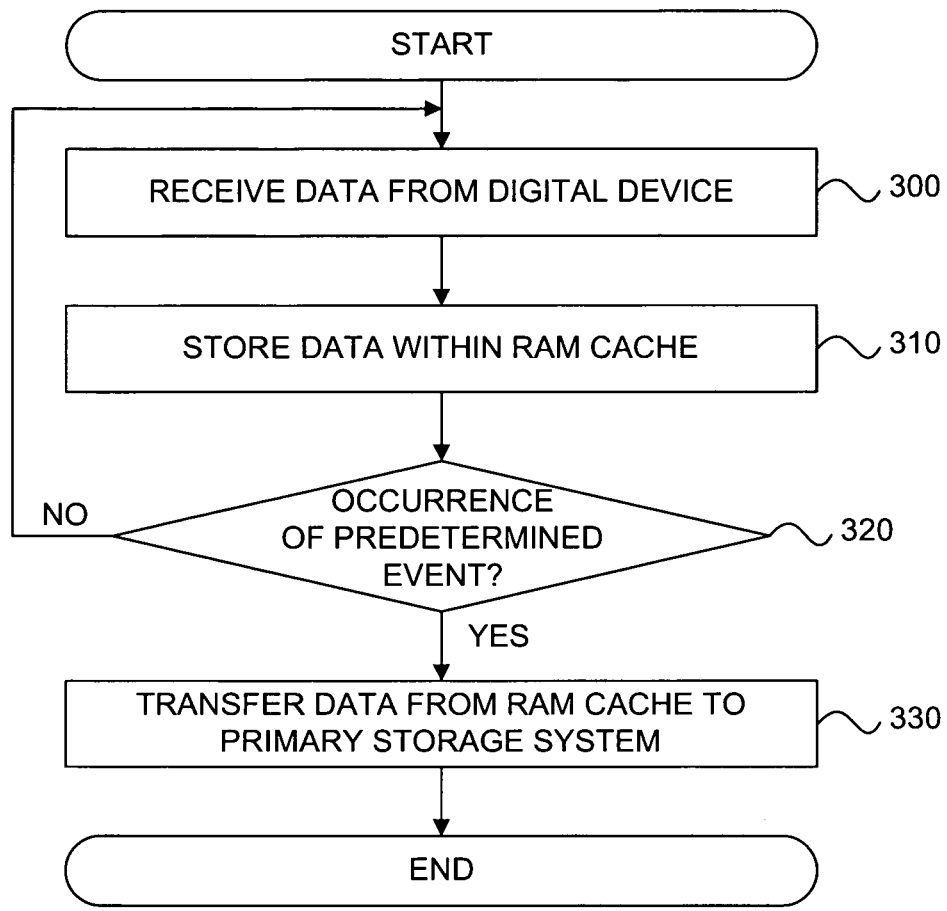
FIG. 3 is a flow chart for storing data within a ram cache, in accordance with one embodiment of the present invention.

FIG. 3 is a flow chart for storing data within a ram cache, in accordance with one embodiment of the present invention. In step 300, the detachable storage device 100 receives data from the digital device. In some embodiments, an active application on the digital device sends data (e.g., temporary files) to be saved within the detachable storage device 100.

Instead of storing the data within the database 260 (FIG. 2), the storage module 280 (FIG. 2) stores the data within the ram cache in step 310. In one example, temporary files may be stored within the ram cache for later retrieval. Upon the occurrence of a predetermined event in step 320, the data within the ram cache may be transferred to the storage system (further described in FIG. 8.)

As discussed previously, a predetermined event can include, but is not limited to, the lapse of a predetermined time, the termination of an application, and the detachment of the detachable storage device 100. In one example, the storage module 280 transfers the data from the ram cache to the storage system every five minutes. The predetermined time may be any length of time.

The storage module 280 can also transfer the data upon the termination of an application. In one example, a web browser sends temporary web files to the ram cache to facilitate reloading web pages should the user return to web pages previously visited. The ram cache may allow for faster performance over the storage system for the storing and retrieval of web pages. Further, the constant storing of web pages to the storage system may limit the functionality and ultimate lifetime of the data storage medium (e.g., flash memory) within the storage system. When the browser is closed by the user, the storage module 280 may transfer all of the temporary files contained within the ram cache to the storage system.

Since all of the data within the ram cache may be written to the storage system at once (rather than many writes to the storage system over a longer time), the duty cycle of the data storage medium within the storage system may be preserved. In one example, the transferring of all of the files from ram cache to the storage system may constitute a single storage event thereby represent only a slight decrement to the duty cycle.

The storage module 280 may also transfer the data from the ram cache to the storage system when the detachable storage device 100 is detached from the digital device (e.g., in a detached state). In one example, when the detachable storage device 100 is detached from the digital device, a power system (further discussed in FIG. 8) may power the ram cache thereby maintaining the data within dynamic memory. The power system may power the storage module 280 which may be configured to transfer all files within the ram cache to the storage system when the detachable storage device 100 is detached. Once the data within the ram cache is transferred, the power system may then cease to power the ram cache.

In various embodiments, the storage module 280 may take different actions depending on the application. In one example, all files that are saved by word processor applications may be stored to the ram cache and ultimately transferred by the storage module 280 to the storage system. The storage module 280 may clear (i.e., delete) all files from the ram cache that are stored by a web application (e.g., temporary cache files and cookies).

The storage module 280 may also take different actions depending on the predetermined event. In exemplary embodiments, the storage module 280 transfers data (e.g., saved files) from the ram cache to the storage system only if the application sending the data to the detachable storage device 100 is closed by the user. If the detachable storage device 100 is detached, the power to the ram cache may be cut and the data within the ram cache may be cleared. There may be many different predetermined events that may cause the storage module 280 to transfer some or all of the data within the ram cache to the storage system.

In various embodiments, the user can configure the storage module 280 to transfer or clear files within the ram cache to the storage system based on different applications or different predetermined events. The user may use the user input dial 120 (FIG. 1) to configure the storage module 280 or a driver/agent on the digital device.

Figure 4:
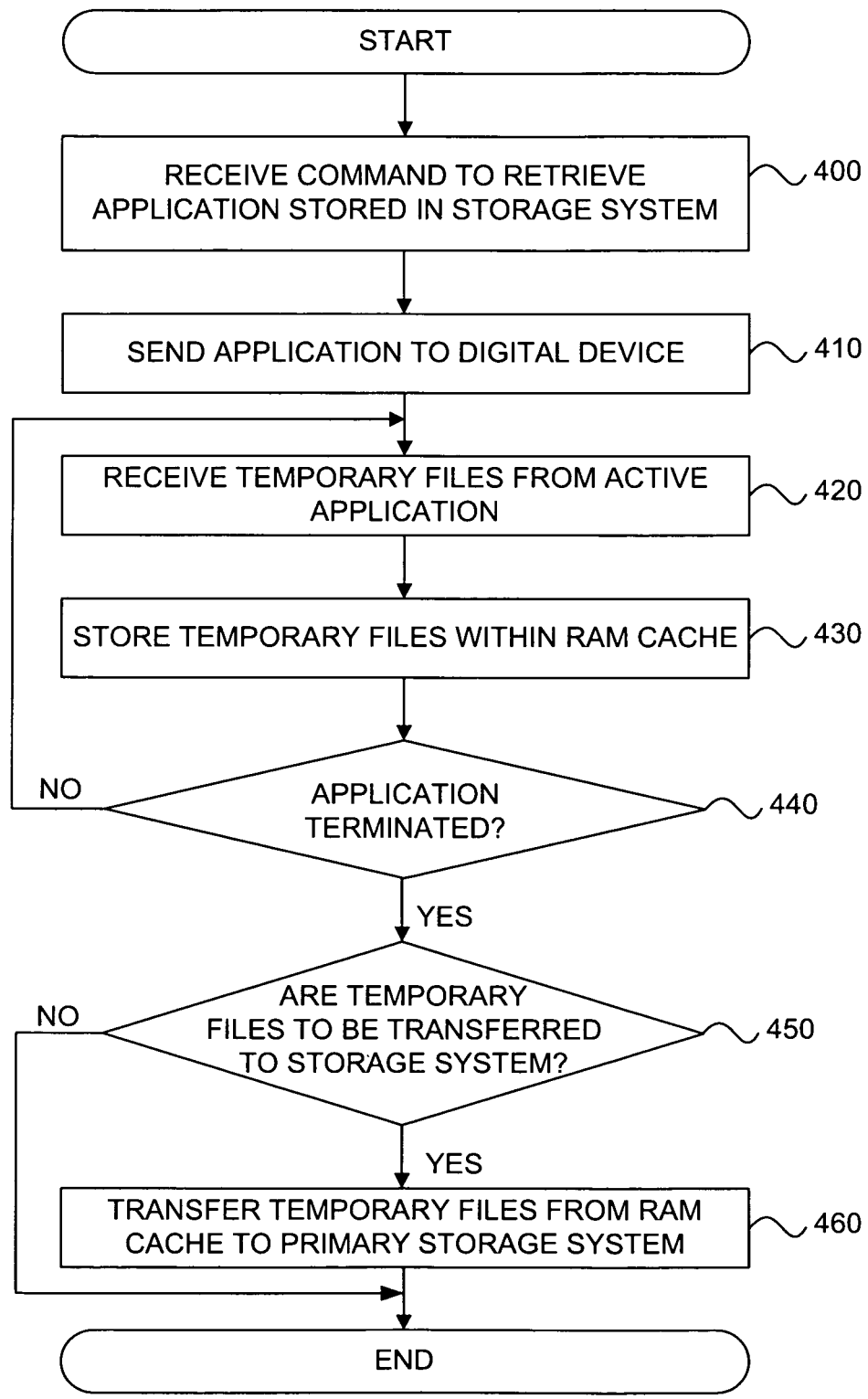
FIG. 4 is a flow chart for activating an application which stores files within the ram cache, in accordance with one embodiment of the present invention.

FIG. 4 is a flow chart for activating an application which stores files within the ram cache, in accordance with one embodiment of the present invention. In step 400, the device controller 200 (FIG. 2) receives a command from the digital device to retrieve an application stored in the storage system. The application may be any executable program. The detachable storage device 100 sends the application to the digital device in step 410. In one example, the application is loaded into random access memory within the digital device. The application may be executed by the digital device.

The detachable storage device 100 may receive temporary files from the active application on the digital device in step 420. In step 430, the detachable storage device 100 stores the temporary files within the ram cache.

In step 440, the detachable storage device 100 determines if the application is terminated. The application may be closed by the user, the application may experience an error and be terminated prematurely, or the detachable storage device 100 may be detached from the digital device. If the application is not terminated, more temporary files may be received form the active application in step 420.

If the application is terminated, the detachable storage device 100 determines if the temporary files are to be transferred from the ram cache to the storage system in step 450. Circuitry (e.g., the storage module 280 (FIG. 2)) may be configured to store saved files from applications such as spreadsheet programs or other document creation programs while not transferring web pages generated from a web browser. If the temporary files are not to be transferred from the ram cache to the storage system, the temporary files may ultimately be cleared by cutting the power to the ram cache or by the storage module 280 actively clearing (i.e., deleting) the temporary files. If the files are to be transferred from the ram cache to the storage system, the detachable storage device 100 transfers the temporary files in step 460.

Figure 5:
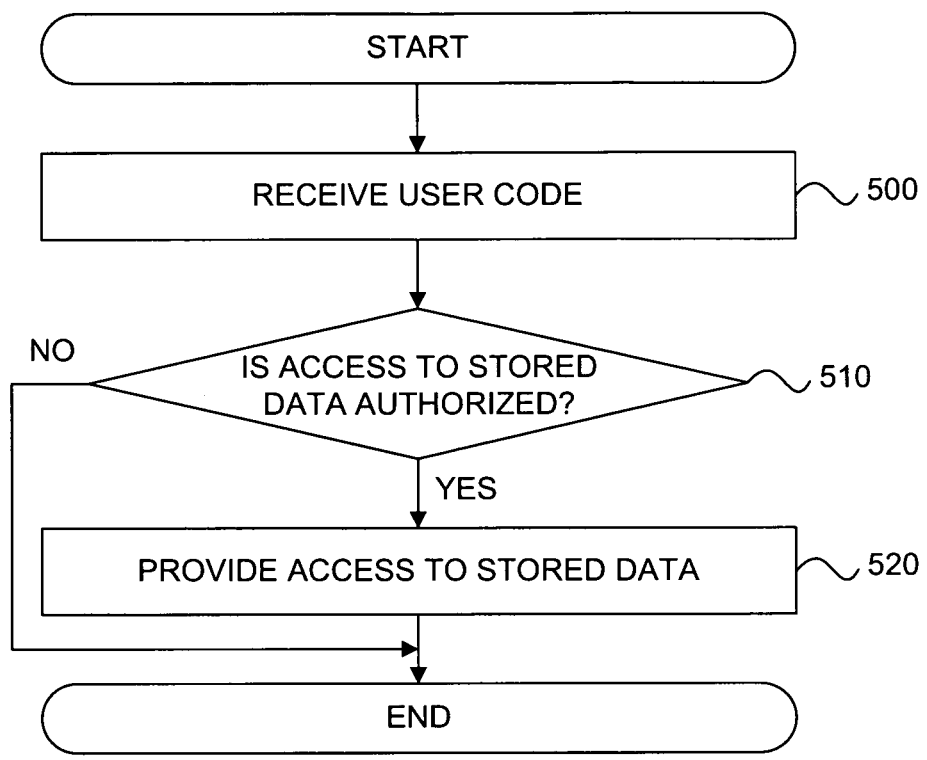
FIG. 5 is a flow chart for the entry of a user code to access stored data, in accordance with one embodiment of the present invention.

FIG. 5 is a flow chart for the entry of a user code to access stored data, in accordance with one embodiment of the present invention. The user interface module 270 (FIG. 2) receives the user code from the user in step 500. The user code may comprise a series of numbers, letters, symbols, or special characters. In other embodiments, the user code comprises a retinal scan, voice identifier, or fingerprint identifier.

In step 510, the authorization module 220 (FIG. 2) determines if access to the stored data or a storage partition is authorized. In one example, the authorization module 220 receives and compares the user code to the one or more authentication passwords within the keystore module 210 (FIG. 2) or the file system 230 (FIG. 2). If the authorization module 220 determines that access to the stored data is authorized, then the authorization module 220 may generate a signal to the device controller 200 (FIG. 2) to allow or provide access to the stored data in step 520. Once access to the stored data is authorized, a digital device (not depicted) may access the data stored within the database 260 of the detachable storage device 100.

Figure 6:
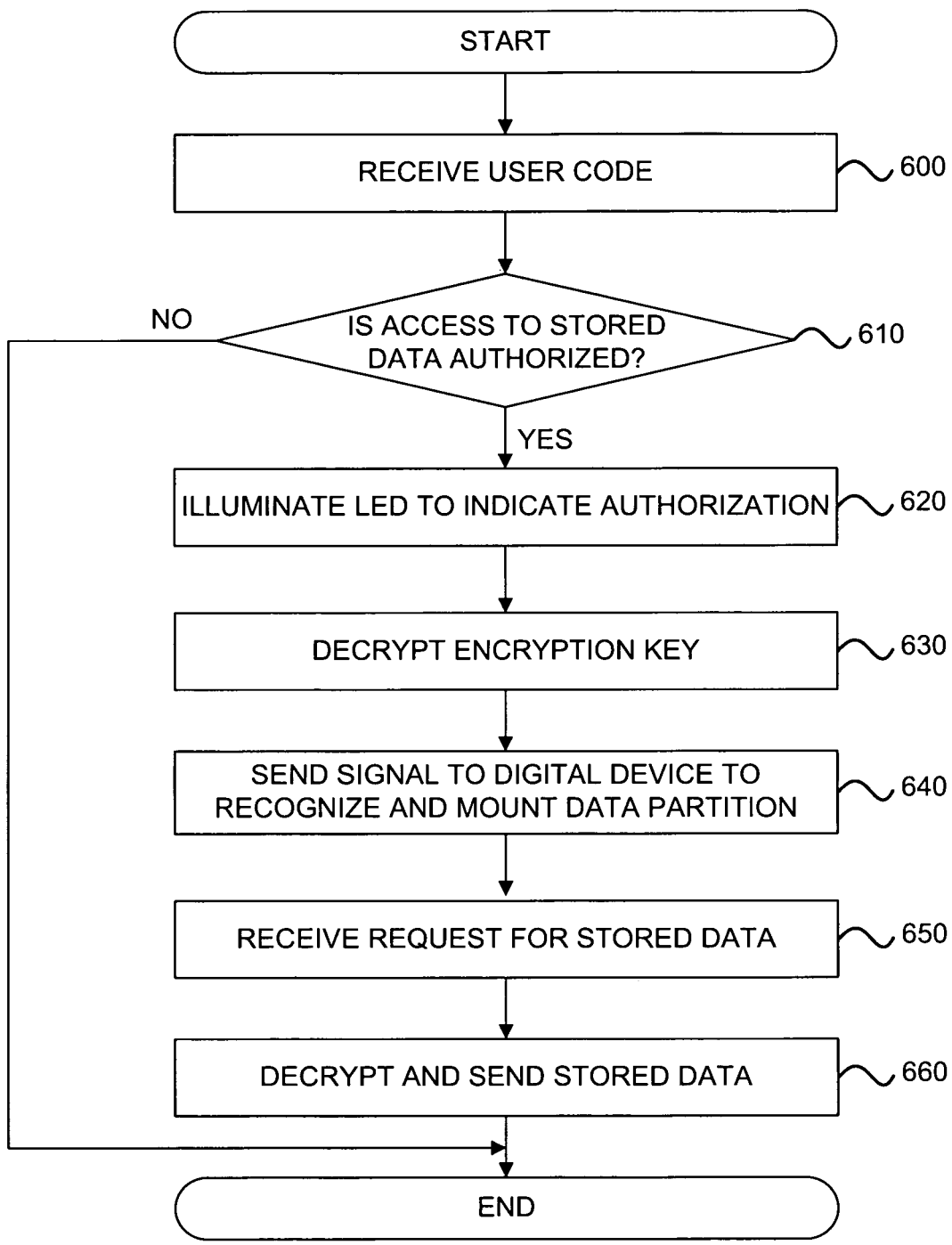
FIG. 6 is another flow chart for the entry of a user code to access stored data, in accordance with one embodiment of the present invention.

FIG. 6 is another flow chart for the entry of a user code to access stored data, in accordance with one embodiment of the present invention. In step 600, the user interface module 270 (FIG. 2) receives the user code from the user. In some embodiments, the user interface module 270 sends the user code to the encryptor 250 (FIG. 2) to decrypt the security code with the user code. The security code can then be transmitted to the authorization module 220 (FIG. 2) to determine if access to the stored data is authorized.

In step 610, the authorization module 220 determines if access to stored data is authorized. In one example, the authorization module 220 receives and processes the security code. The authorization module 220 can base the authorization determination, at least in part, upon the security code. In other embodiments, the authorization module 220 can base the authorization determination, at least in part, upon the security code and an authentication password. In an example, the authorization module 220 can retrieve the authentication password from the keystore module 210 (FIG. 2), the file system 230 (FIG. 2), or the database 260 (FIG. 2). In some embodiments, the authentication password is stored with one or more other authentication passwords. The authentication password may be stored in a hash table and/or encrypted. If the authorization module 220 determines that access to the stored data is authorized, then the device controller 200 (FIG. 2) can send a signal to illuminate the LED to indicate authorization in step 620. If access to the stored data is not authorized, FIG. 6 ends. Lockout and resetting the detachable storage device 100 is further discussed in FIG. 7.

In step 630, in response to authorization to access the stored data, the encryptor 250 decrypts the encryption key. The encryption key can be used to encrypt data received from the digital device prior to storing within the database 260. Similarly, the encryption key can be used to decrypt stored data received from the database 260 to send to the digital device. The process of encryption/decryption can occur during saving and transmitting data with no appreciable loss of speed. In some embodiments, an encryption key and a separate decryption key are decrypted by the encryptor 250.

Upon authorization, the device controller 200 can descramble the database file system contained within the file system 230. As a result, the data storage partition containing the database 260 may be mounted once the detachable storage device 100 is operationally coupled to the digital device.

In exemplary embodiments, after authorization is indicated, the detachable storage device 100 (FIG. 2) can be operationally coupled with a digital device. In one example, the user inputs the correct user code and receives an indication that access to the stored data is authorized. The user can then couple the detachable storage device 100 to the digital device, which subsequently sends an identification query to the detachable storage device 100.

In step 640, optionally in response to an identification query from the digital device, the device controller 200 sends a signal to the digital device to identify the detachable storage device 100 and mount the data storage partition. In step 650, the device controller 200 receives a request for stored data from the digital device. The requested stored data is unencrypted by the encryptor 250 with the proper encryption key prior to sending the requested stored data to the digital device in step 660.

In exemplary embodiments, the access to the stored data is authorized only for a predetermined period of time before re-authorization is required. In one example, access to the stored data within the detachable storage device 100 remains authorized for two minutes unless the detachable storage device 100 is operationally coupled to a digital device during that time.

In other embodiments, re-authorization is required after a predetermined period of inactivity. In one example, access to stored data is authorized and the detachable storage device 100 is subsequently operationally coupled to a digital device via a USB connector. If data is not stored on the detachable storage device 100 or retrieved from the detachable storage device 100 within 30 minutes, then access to stored data may be denied until re-authorization.

In some embodiments, re-authorization is required after the detachable storage device 100 is decoupled from the digital device or after the user presses a switch or button to terminate the session. In one example, the user unplugs the detachable storage device 100 from a USB port on the digital device which terminates the session and access to the stored data requires re-authorization. It will be apparent to those skilled in the art that there may be many ways to terminate a session and require re-authorization.

In exemplary embodiments, the user can change or otherwise customize the user code. In one example, the user code comprises numbers, letters, symbols, or special characters. The user may enter a customize code to change the user code. In an example, the customize code can be sent from the manufacturer with the detachable storage device 100. In another example, the user downloads the customize code from a website. The customize code may be unique to each detachable storage device 100. Further, the customize code may change on every code change or after a predetermined time interval.

The user code can also comprise a fingerprint, voice identifier, or retina scan. In various embodiments, the customize code can be entered into the detachable storage device 100 through buttons or switches. The fingerprint, voice identifier, or retina scan can then be entered. The entered fingerprint, voice identifier, or retina scan can then be used as the user code.

Figure 7:
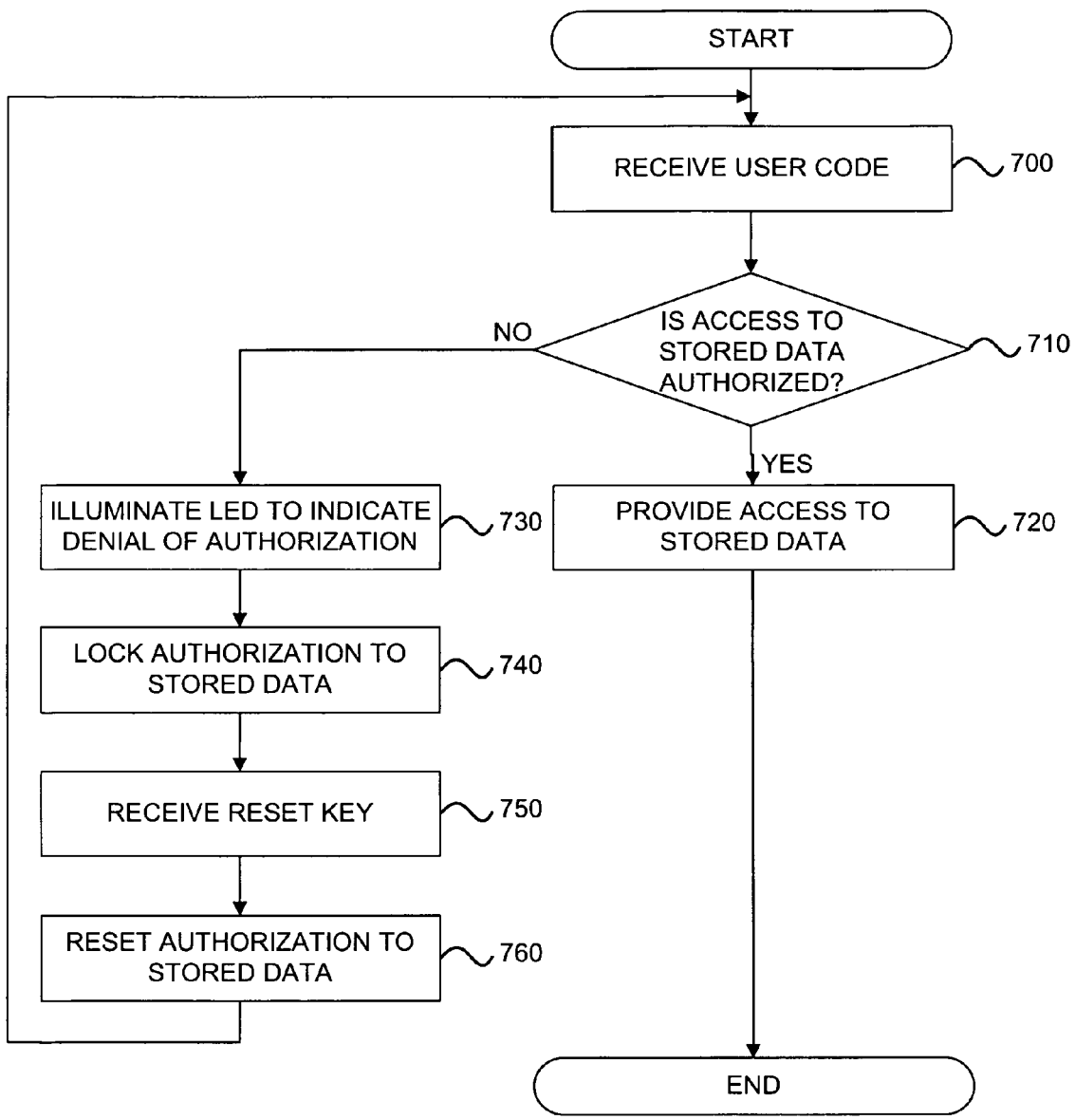
FIG. 7 is a flow chart for locking and resetting the detachable storage device, in accordance with one embodiment of the present invention.

FIG. 7 is a flow chart for locking and resetting the detachable storage device 100, in accordance with one embodiment of the present invention. In step 700, the device controller 200 (FIG. 2) receives the user code from the user to access to the stored data within the detachable storage device 100 (FIG. 2).

In step 710, the authorization module 220 (FIG. 2) authenticates the user code to determine if access to the stored data is authorized. If access to the stored data is authorized, then the device controller 200 provides an operationally coupled digital device access to the stored data in step 720. If access to the stored data is not authorized and the user code is incorrect, the device controller 200 transmits a signal to illuminate an LED to indicate that denial of authorization in step 730. In one example, the LED is red which indicates the denial of authorization. In other embodiments, a sound is generated by the detachable storage device 700 or light and one or more sounds are generated by the detachable storage device 700 to indicate denial of authorization. In some embodiments, a message may be displayed on display 130 indicating that authorization is accepted or denied.

In step 740, the device controller 200 locks authorization to the stored data. This "lock out" requires that the detachable storage device 100 be reset before access to the stored data is authorized. In some embodiments, a predetermined number of attempts to authorize access occur before the detachable storage device 100 is locked out. The device controller 200 can transmit a signal to the authorization indicator (FIG. 1) to indicate that the detachable storage device 100 is locked.

In exemplary embodiments, the user visits a product website, identifies the detachable storage device 100, and requests a reset key. The reset key is a code that resets the detachable storage device 100 so that the user can seek access to the stored data. In one example, the user creates an account on a website and must answer specific questions to authenticate the user's identity prior to requesting the reset key. The reset key can change over an interval of time, upon every use, or upon each request for the reset key. In other embodiments, the user receives the reset key upon purchase of the detachable storage device 100.

In step 750, the device controller 200 receives the reset key from the user. The reset key can be used to decrypt a reset code prior to resetting the detachable storage device 100. Further, the authorization module 220 may determine that the reset key and/or the reset code are authentic prior to resetting.

In step 760, the device controller 200 resets the detachable storage device 100. In some embodiments, the device controller 200 transmits a signal to the authorization indicator to indicate that the detachable storage device 100 is no longer locked. In some embodiments, the device controller 200 transmits an unlock signal to the authorization module to unlock the detachable storage device 100 so that the detachable storage device 100 can again receive a user code to access the stored data in step 700.

Figure 8:
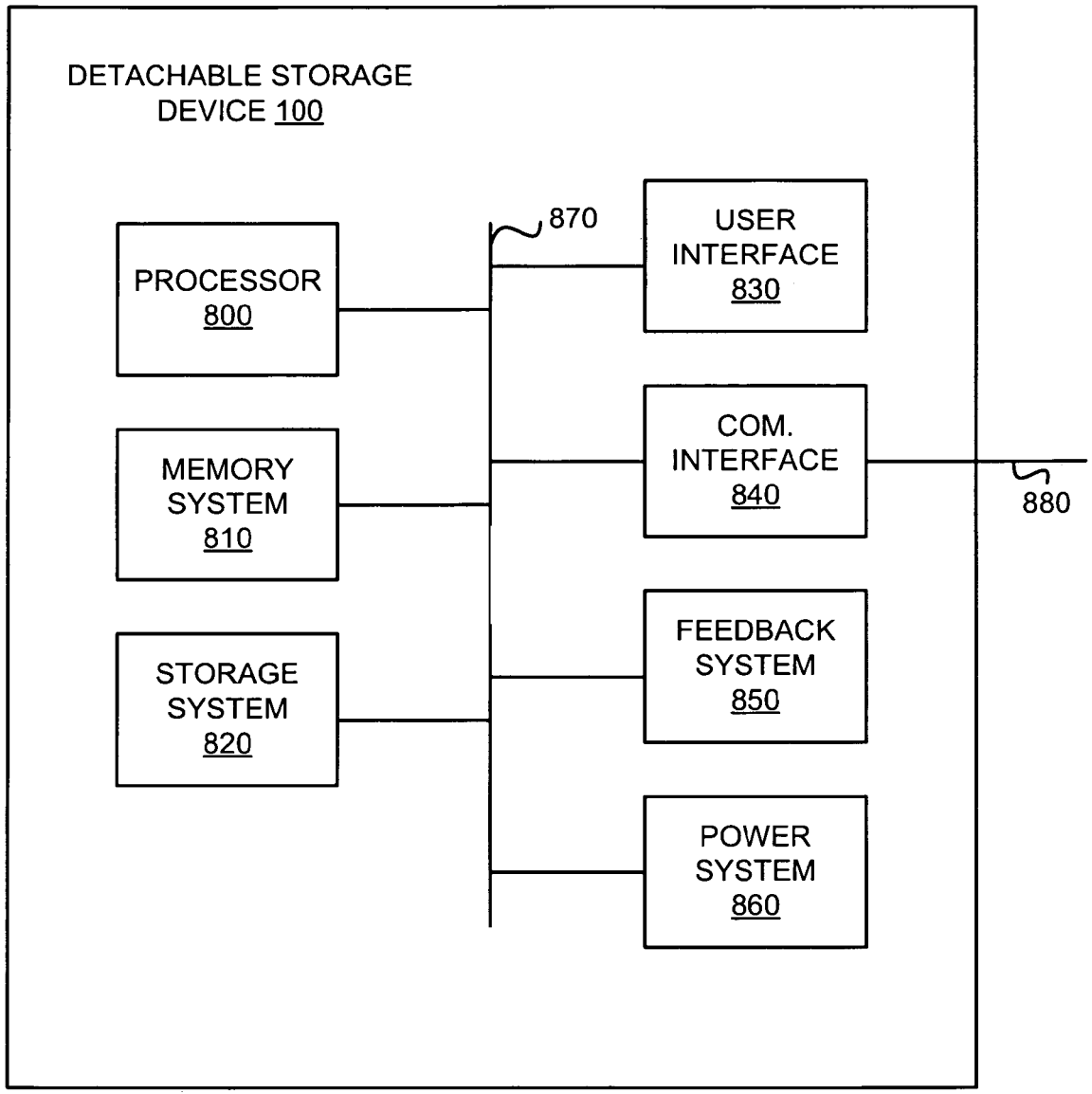
FIG. 8 depicts a detachable storage device, in accordance with one embodiment of the present invention.

FIG. 8 is a block diagram of the detachable storage device 100 in an exemplary implementation of the invention. The detachable storage device 100 comprises a processor 800, a memory system 810, a storage system 820, a user interface 830, a communication interface 840, feedback system 850, and a power system 860 which are all coupled to a system bus 870. The processor 800 is configured to execute executable instructions (e.g., programs). In some embodiments, the processor 800 comprises circuitry or any processor capable of processing the executable instructions.

The memory system 810 is any memory configured to store data. Some examples of the memory system 810 are storage devices, such as RAM or ROM. The memory system 810 can comprise the ram cache. In various embodiments, data is stored within the memory system 810. The data within the memory system 810 may be cleared or ultimately transferred to the storage system 820.

The storage system 820 is any storage configured to retrieve and store data. Some examples of the storage system 820 are flash drives, hard drives, optical drives, and/or magnetic tape. The storage system 820 can comprise a database 260 (FIG. 2) or other data structure configured to hold and organize data. In some embodiments, the detachable storage device 100 includes a memory system 810 in the form of RAM and a storage system 820 in the form of flash data.

The user interface 830 is any device that can receive a user code. The user interface 830 can be, but is not limited to, a user input dial 120 (FIG. 1), keypad, or biosensor.

The communication interface 840 can be coupled to any digital device via the link 880. As discussed in FIG. 1, the communication interface 840 may support communication over a USB connection, a firewire connection, an Ethernet connection, a serial connection, a parallel connection, Host Bus Adapter, flash card interface, or an ATA connection. The communication interface 840 may also support wireless communication (e.g., 802.11a/b/g/n or wireless USB). It will be apparent to those skilled in the art that the communication interface 840 can support many wired and wireless standards.

The feedback system 850 is any indicator that signals the user that access to the stored data within the detachable storage device 100 is authorized. In some examples, the feedback system 850 can be an LED light or sound. The feedback system 850 may also comprise circuitry to display messages on the display 130 (e.g., access to a storage partition is authorized) The feedback system 850 may also indicate that access to the stored data is not authorized or that the detachable storage device 100 is locked.

The optional power system 860 is any system that can provide power to the detachable storage device 100. The power system 860 can supply power to the detachable storage device 100 to receive the user code and authorize access to the stored data. In one example, the power system 860 comprises a rechargeable battery, a replaceable battery, or a capacitor. The batteries or capacitor may be recharged with a power recharger or from power received from the digital device. In some embodiments, the power system 860 is optional, and the user code can be passively received. Once the detachable storage device 100 is coupled to the digital device, power can be received from the digital device and the authorization process completed.

In some embodiments, the power system 860 supplies power to the processor 800 when the detachable storage device 100 is not coupled to a digital device. In one example, the power system 860 supplies power to the processor 800 during the process of receiving the user code and authorization. Once the detachable storage device 100 is coupled to the digital device, the digital device may supply power to the detachable storage device 100.

Although many of the embodiments discussed herein discuss a detachable storage device 100, the embodiments may be used with any portable and/or removable storage device, including, but not limited to portable flash storage device, a USB storage device, flash card, secure storage device, or portable hard drive. In one example, a USB storage device comprises a ram cache configured to receive and store temporary files until a predetermined event upon which the temporary files may be stored within the storage system 820. Those skilled in the art will appreciate that any detachable storage device may be used with embodiments of the claimed invention.

The above-described functions can be comprised of executable instructions that are stored on data storage medium. The executable instructions can be retrieved and executed by the processor 800. Some examples of executable instructions are software, program code, and firmware. Some examples of storage media are memory devices, tape, disks, integrated circuits, and servers. The executable instructions are operational when executed by the processor to direct the processor to operate in accord with the invention. Those skilled in the art are familiar with executable instructions, processor(s), and storage media.

What is claimed is:

1. A detachable USB flash storage device comprising:
a storage system configured to store data;
a user interface configured to receive a user code from a user when the detachable USB flash storage device is in a detached state to authorize access to a storage partition within the storage system;
circuitry configured to authorize access to the data stored within the storage system based, at least in part, on the user code and provide access to the storage partition;
a ram cache configured to receive data comprising files from a digital device; and
a storage module configured to:
transfer a first portion of the files from the ram cache on the detachable USB flash storage device to the storage system upon detachment of the detachable USB flash storage device from the digital device; and
delete a second portion of the files from the ram cache on the detachable USB flash storage device upon detachment of the detachable USB flash storage device from the digital device;
wherein the user interface is used to configure the storage module to transfer the first portion of the files from the ram cache and delete the second portion of the files within the ram cache upon the detachment of the detachable USB flash storage device from the digital device, such that the first portion of the files is stored in the storage system upon detachment of the device, and the second portion of the files is cleared and not transferred to the storage system upon detachment of the device.

2. The detachable USB flash storage device of claim 1, wherein the ram cache is dynamic random access memory (DRAM).

3. The detachable USB flash storage device of claim 1, further comprising a communications interface configured to send a signal to the digital device that the storage partition is authorized for access.

4. The detachable USB flash storage device of claim 1, wherein the circuitry is further configured to alert the user that access to the storage partition is allowed based on the authorization.

5. The detachable USB flash storage device of claim 1, wherein the circuitry configured to authorize access to the storage partition comprises the circuitry configured to decrypt a security code based on the user code.

6. The detachable USB flash storage device of claim 1, wherein the circuitry configured to provide access to the stored data comprises the circuitry configured to decrypt at least some of the stored data within the storage partition.

7. The detachable USB flash storage device of claim 1, wherein the storage module is configured to transfer or delete the files within the ram cache based on different applications that store the files within the ram cache.

8. The detachable USB flash storage device of claim 7, wherein the storage module is configured to transfer saved document files from the ram cache to the storage system upon detachment of the detachable USB flash storage device while deleting temporary files by actively clearing the temporary files from the ram cache upon detachment of the detachable USB flash storage device.

9. The detachable USB flash storage device of claim 8, wherein the temporary files comprise web pages generated from a web browser.

10. The detachable USB flash storage device of claim 9, wherein the storage module is configured to transfer the temporary files comprising the web pages from the ram cache to the storage system when the web browser is closed by the user and to delete the temporary files comprising the web pages upon detachment of the detachable USB flash storage device.

11. A method for storing data within a detachable USB flash storage device, the method comprising:
receiving a user code into the detachable USB flash storage device when the detachable USB flash storage device is in a detached state, the user code received from a user interface on the detachable USB flash storage device;
authorizing access to stored data within a storage system of the detachable USB flash storage device based, at least in part, on the user code;
providing access to the stored data within the storage system;
receiving data comprising files from a digital device with the detachable USB flash storage device;
storing the files within a ram cache; and
upon detachment of the detachable USB flash storage device from the digital device, transferring a first portion of the files from the ram cache on the detachable USB flash storage device to the storage system and deleting a second portion of the files from the ram cache on the detachable USB flash storage device;
wherein the detachable USB flash storage device is configured with the user interface to transfer the first portion of the files from the ram cache or and delete the second portion of the files within the ram cache upon the detachment of the detachable USB flash storage device from the digital device, such that the first portion of the files is stored in the storage system upon detachment of the device, and the second portion of the files is cleared and not transferred to the storage system upon detachment of the device.

12. The method of claim 11, wherein the ram cache is implemented within dynamic random access memory (DRAM).

13. The method of claim 11, further comprising sending a signal to the digital device that the stored data is authorized for access.

14. The method of claim 11, further comprising alerting the user that access to the stored data is allowed based on the authorization.

15. The method of claim 11, wherein authorizing access to the stored data comprises decrypting a security code based on the user code.

16. The method of claim 11, wherein providing access to the stored data comprises decrypting at least some of the stored data.

17. The method of claim 11, wherein the files within the ram cache are transferred or deleted based on different applications that store the files within the ram cache.

18. The method of claim 17, wherein upon detachment of the detachable USB flash storage device, saved document files from the different applications are transferred from the ram cache to the storage system and temporary files from the different applications are deleted by actively clearing the temporary files from the ram cache.

19. The method of claim 18, wherein the temporary files comprise web pages generated from a web browser.

20. The method of claim 19, wherein:
the temporary files comprising the web pages are transferred from the ram cache to the storage system when the web browser is closed by the user; and
the temporary files comprising the web pages are deleted from the ram cache upon detachment of the detachable USB flash storage device.

21. A non-transitory computer readable medium having embodied thereon a program, the program being executable by a processor to perform a method for storing data within a detachable USB flash storage device, the method comprising:
- receiving a user code into the detachable USB flash storage device when the detachable storage device is in a detached state, the user code received from a user interface on the detachable USB flash storage device;
- authorizing access to stored data within a storage system of the detachable USB flash storage device based, at least in part, on the user code;
- providing access to the stored data within the storage system;
- receiving data comprising files from a digital device with the detachable USB flash storage device;
- storing the files within a ram cache; and
- upon detachment of the detachable USB flash storage device from the digital device, transferring a first portion of the files from the ram cache on the detachable USB flash storage device to the storage system and deleting a second portion of the files from the ram cache on the detachable USB flash storage device;
- wherein the user interface configures the detachable USB flash storage device to transfer the first portion of the files from the ram cache and delete the second portion of the files within the ram cache upon the detachment of the detachable USB flash storage device from the digital device, such that the first portion of the files is stored in the storage system upon detachment of the device, and the second portion of the files is cleared and not transferred to the storage system upon detachment of the device.

22. The non-transitory computer readable medium of claim 21, wherein the detachable USB flash storage device is configured to transfer or delete the files within the ram cache such that some files from the ram cache are transferred to the storage system and other files are cleared based on different applications that store the files within the ram cache.

23. The non-transitory computer readable medium of claim 21, wherein the detachable USB flash storage device is configured to transfer temporary files from the ram cache to the storage system when an application is closed by the user, and to delete the temporary files by actively clearing the temporary files from the ram cache upon detachment of the detachable USB flash storage device.

* * * * *

UNITED STATES PATENT AND TRADEMARK OFFICE
CERTIFICATE OF CORRECTION

| | | |
|---|---|---|
| PATENT NO. | : 8,639,873 B1 | Page 1 of 1 |
| APPLICATION NO. | : 11/644051 | |
| DATED | : January 28, 2014 | |
| INVENTOR(S) | : Jevans et al. | |

It is certified that error appears in the above-identified patent and that said Letters Patent is hereby corrected as shown below:

In the Claims

Col. 16, line 27, claim 11,
　"files from the ram cache or and delete the second"

should read:
　-- files from the ram cache and delete the second --

Signed and Sealed this
Sixteenth Day of September, 2014

Michelle K. Lee
*Deputy Director of the United States Patent and Trademark Office*